No. 710,075. Patented Sept. 30, 1902.
J. J. ROOKUS.
BEET HARVESTER.
(Application filed Jan. 27, 1902.)

(No Model.)

Witnesses
Palmer A. Jones.
Ida Thiebout.

Inventor
John J. Rookus.

By Luther V. Moulton
Attorney

THE NORRIS PETERS CO., PHOTO-LITHO., WASHINGTON, D. C.

UNITED STATES PATENT OFFICE.

JOHN J. ROOKUS, OF ZEELAND, MICHIGAN.

BEET-HARVESTER.

SPECIFICATION forming part of Letters Patent No. 710,075, dated September 30, 1902.

Application filed January 27, 1902. Serial No. 91,432. (No model.)

*To all whom it may concern:*

Be it known that I, JOHN J. ROOKUS, a citizen of the United States, residing at Zeeland, in the county of Ottawa and State of Michigan, have invented certain new and useful Improvements in Beet-Harvesters; and I do hereby declare the following to be a full, clear, and exact description of the invention, such as will enable others skilled in the art to which it appertains to make and use the same.

My invention relates to improvements in harvesters for harvesting beets and other like vegetables; and its object is to provide a device adapted to operate on two rows at once, to provide a cheap, simple, and effective device, and to provide the same with certain new and useful features hereinafter more fully described, as particularly pointed out in the claims, reference being had to the accompanying drawings, in which—

Figure 1:
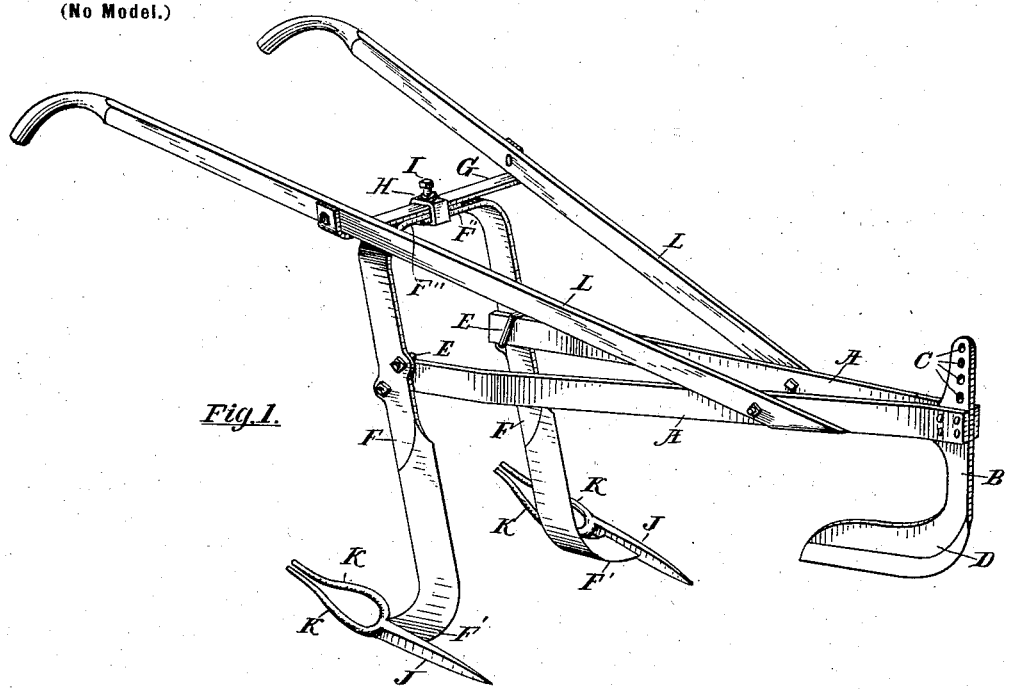
Figure 2:
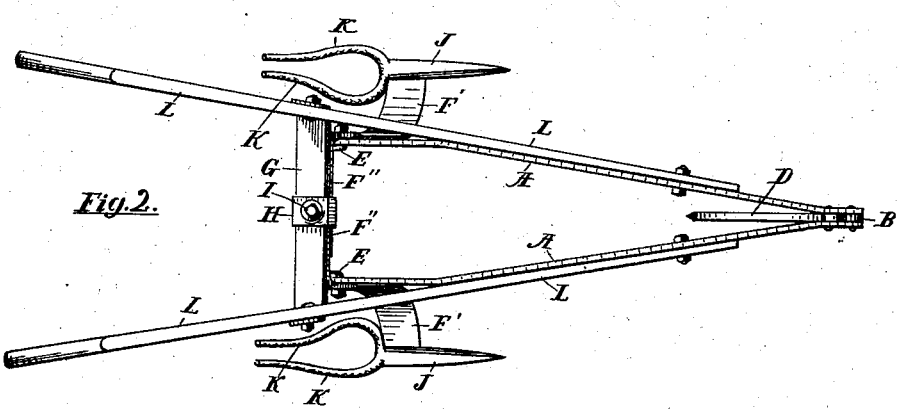

Figure 1 is a perspective of a device embodying my invention, and Fig. 2 a plan view of the same.

Like letters refer to like parts in both figures.

A A are two rearwardly-diverging and horizontally-flexible bars, which are bent at the respective ends in parallel vertical planes. Between the forward ends of these bars is rigidly secured a post B, having its upper end projecting above the bars and provided with a series of openings C to vertically adjust the attachment of the team thereto. This post B also extends downward below the bars and is provided at its lower end with a shoe or blade D, having a sharp lower edge adapted to enter the soil and prevent lateral movement of the forward ends of the bars due to an unequal resistance of the plows or diggers. Secured to the rear ends of the bars A by clips E are posts F, extending downward and outward and each having a sharp forward edge to sever the soil at one side and beneath the rows of beets. These bars also extend upward and are bent inward, having overlapping and longitudinally-adjustable horizontal portions F" F"', which are adjustably secured to each other and to a cross-bar G, extending horizontally above the same, by means of a suitable clip H, having a set-screw I. The upper parts of these posts are also made flexible to permit the lower ends of the same to yield laterally. The bar G is attached to the respective handles L L, which extend forward and downward and are attached to the bars A A, thus forming braces to support the posts F F. Attached to the lower and outwardly-projecting ends of the posts F are suitable points J to enter and open the soil.

K represents rearwardly and upwardly projecting fingers at the rear of the points J, which fingers curve outwardly near the points J, and thence converge and terminate close together at the rear.

The bars A are sufficiently flexible to permit of all necessary adjustment of the posts F" F" to adjust the distance of the points J to properly run beneath two rows of beets, while the bar G being of fixed length the handles remain at a fixed distance apart. The flexibility of the upper parts of the posts F" F" and of the bars A A is quite sufficient also to permit either post to yield laterally should it encounter a stone or other obstruction, and thus easily pass the same without interfering with the action of the other post. As the soil is lifted by the point J it is loosened and a considerable portion near the lower end of the beets passes through between the fingers K. The beets, however, encounter the converging portions of the fingers and sliding along the same are forced upward and out of the loosened soil. The fingers also being flexible will yield to permit large beets or other obstructions to pass without damage. The blade D enters and traverses the soil freely in the direction of its length, but effectually prevents lateral movement of the forward part of the device when there is any uneven resistance to the forward movement of the respective diggers, and thus enables the operator to properly guide the device.

Having thus fully described my invention, what I claim, and desire to secure by Letters Patent, is—

1. In a beet-harvester two separate diggers adapted to operate upon separate rows of beets, a frame connecting the same, and a blade attached to the frame and adapted to enter and traverse the soil and prevent lateral movement of the frame, substantially as described.

2. In a beet-harvester a post having a blade at the lower end adapted to enter and traverse the soil, rearwardly extended and diverging bars attached to the post, posts attached to the rear of the bars and having diggers attached at their lower ends and inwardly-extended upper ends adjustably secured to a cross-bar, and handles connected to the ends of the cross-bar and to the first-named bars, substantially as described.

3. In a beet-harvester the combination of diverging and horizontally-flexible bars, rigidly connected at the forward ends, and posts attached to the respective rear ends, and having diggers attached to the lower ends, and having flexible upper ends extending upward and inward and adjustably connected to each other, substantially as described.

4. In a beet-harvester the combination of diverging and horizontally-flexible bars, bent in parallel ends at the ends and rigidly attached at the front ends, posts attached at the rear ends of the bars and extending downward and thence outward, diggers attached to the outer ends of the posts to operate upon separate rows of beets, said posts also extending upward and inward and adjustably secured to a cross-bar, and handles attached to the respective ends of the cross-bar and to the diverging bars, substantially as described.

5. In a beet-harvester a post at the front having a blade at the bottom, diverging and rearwardly-extended bars attached to the post, posts attached to the rear ends of the bars, and extending downward therefrom, diggers on the lower ends of the posts to operate on separate rows of beets, said posts also extending upward and inward and having their inner ends overlapping and adjustable, a cross-bar, a clip, surrounding the cross-bar and overlapping ends of the posts, and handles attached to the cross-bar and to the first-named bars substantially as described.

6. In a beet-harvester, a frame, a post attached to the frame and having a laterally-extended lower end, and rearwardly and upwardly extended fingers attached to the said lower end, substantially as described.

7. In a beet-harvester, a frame, a post attached to the frame and having a laterally-extended lower end and a forwardly-projecting point, and rearwardly-projecting fingers attached to the said lower end, substantially as described.

8. In a beet-harvester, a frame, a post attached to the frame and having a laterally-extended lower end, a point attached to the post, and upwardly and rearwardly extended and converging fingers at the rear of the point, substantially as described.

9. In a beet-harvester, a frame, a post attached to the frame and having a laterally-extended lower end, and upwardly and rearwardly extended converging and flexible fingers attached to said lower end, substantially as described.

10. In a beet-harvester means for severing the soil at the side of the row of beets and for loosening the soil beneath the same, and upwardly-inclined and converging flexible fingers attached to the said means, substantially as described.

11. In a beet-harvester, a frame, a post attached to the front of the frame and having a blade to enter the soil and guide the frame, posts attached to the respective sides of the frame and having outwardly-turned lower ends, and points and inwardly-projecting upwardly-inclined fingers attached to the said ends, substantially as described.

In testimony whereof I affix my signature in presence of two witnesses.

JOHN J. ROOKUS.

Witnesses:
JOHN J. SCHUURMAN,
GEO. DE JONGE.